(12) United States Patent
Dammann et al.

(10) Patent No.: US 10,745,602 B2
(45) Date of Patent: Aug. 18, 2020

(54) LIGNOSULFONATE COATED CALCIUM CHLORIDE

(71) Applicant: OMS INVESTMENTS, INC., Los Angeles, CA (US)

(72) Inventors: Laurence G. Dammann, Hilliard, OH (US); Roger D. Phillips, Marysville, OH (US); Kyle D. King, Marysville, OH (US)

( * ) Notice: Subject to any disclaimer, the term of this patent is extended or adjusted under 35 U.S.C. 154(b) by 0 days.

(21) Appl. No.: 16/093,172

(22) PCT Filed: Apr. 14, 2017

(86) PCT No.: PCT/US2017/027591
§ 371 (c)(1),
(2) Date: Oct. 12, 2018

(87) PCT Pub. No.: WO2017/180982
PCT Pub. Date: Oct. 19, 2017

(65) Prior Publication Data
US 2019/0078004 A1  Mar. 14, 2019

Related U.S. Application Data

(60) Provisional application No. 62/322,646, filed on Apr. 14, 2016.

(51) Int. Cl.
*C09K 3/18* (2006.01)
*C01F 11/24* (2006.01)
*B01J 2/00* (2006.01)

(52) U.S. Cl.
CPC .............. *C09K 3/185* (2013.01); *B01J 2/006* (2013.01); *C01F 11/24* (2013.01); *C01P 2004/60* (2013.01)

(58) Field of Classification Search
CPC . C09K 3/18; C09K 3/185; C01F 11/24; C01P 2004/60; B01J 2/006
See application file for complete search history.

(56) References Cited

U.S. PATENT DOCUMENTS

| 4,668,416 | A  | * | 5/1987 | Neal | C09K 3/22 106/123.11 |
| 4,698,225 | A  |   | 10/1987 | Morrison | |
| 4,824,588 | A  | * | 4/1989 | Lin | C09K 3/18 252/396 |
| 4,986,925 | A  | * | 1/1991 | Fiske | C09K 3/185 252/70 |
| 8,182,714 | B2 | * | 5/2012 | Ossian | C09K 3/185 106/13 |
| 9,133,378 | B2 | * | 9/2015 | Maslow | C09K 3/185 |
| 9,458,368 | B2 | * | 10/2016 | Matuszczak | C09K 3/185 |
| 2005/0062014 | A1 | * | 3/2005 | Hartley | C09K 3/18 252/70 |
| 2006/0178271 | A1 |   | 8/2006 | Lynch et al. | |
| 2014/0284518 | A1 | * | 9/2014 | Maslow | C09K 3/185 252/70 |
| 2015/0344759 | A1 |   | 12/2015 | Matuszczak et al. | |

FOREIGN PATENT DOCUMENTS

| CN | 106190034 A | * | 12/2016 |
| JP | 49-44986 A | * | 4/1972 |

OTHER PUBLICATIONS

International Search Report and Written Opinion of the International Searching Authority for International Patent Application No. PCT/US17/27591, dated Jul. 3, 2017 (11 pages).

* cited by examiner

*Primary Examiner* — Anthony J Green
(74) *Attorney, Agent, or Firm* — Ulmer & Berne LLP

(57) ABSTRACT

Ice-melt compositions including calcium chloride coated with a lignosulfonate material are disclosed. The ice-melt compositions can be useful as ice-melt products with improved safety. Also disclosed are methods of melting ice using an ice-melt composition and methods of making an ice-melt composition.

22 Claims, 1 Drawing Sheet

LIGNOSULFONATE COATED CALCIUM CHLORIDE

REFERENCE TO RELATED APPLICATIONS

The present application is a national stage application under 35 U.S.C. § 371 of International Application No. PCT/US17/27591, filed Apr. 14, 2017, which claims the priority of U.S. provisional application Ser. No. 62/322,646, filed Apr. 14, 2016, both entitled LIGNOSULFONATE COATED CALCIUM CHLORIDE, and hereby incorporates the same applications herein by reference in their entireties.

TECHNICAL FIELD

The present disclosure generally relates to calcium chloride products for melting ice.

BACKGROUND

Calcium chloride is commonly used as an ice-melt material to melt ice and snow on sidewalks, roads, driveways, etc. For example, calcium chloride pellets are among the most effective ice-melting products on the market. When calcium chloride dissolves in water, it releases considerable heat as part of an exothermic process. The heat enables calcium chloride to be an effective ice-melt material at temperatures as low as about −25° F. Compared to other ice-melting compounds, such as sodium chloride, calcium chloride can melt ice faster and at lower temperatures. Calcium chloride is also less corrosive and less harmful to vegetation than sodium chloride.

However, calcium chloride is also known to be hygroscopic (water-absorbing). This can be a problem for people or animals that come into contact with calcium chloride. Specifically, because calcium chloride is strongly water/moisture-absorbing, when a person or animal (e.g., pet) comes into contact with calcium chloride, they can experience harmful effects, such as irritation to their skin, mouth, or eyes.

SUMMARY

According to one embodiment, an ice-melt composition includes coating particles. Each of the coated particles includes a core and a coating at least partially surrounding the core. The core includes calcium chloride. The coating includes a lignosulfonate material. The coated particles include about 0.1% to about 5%, by weight, of the lignosulfonate material.

According to another embodiment, an ice-melt composition includes coating particles. Each of the coated particles includes a core and a coating at least partially surrounding the core. The core includes calcium chloride. The coating consists essentially of a lignosulfonate material. The coated particles include about 0.1% to about 5%, by weight, of the lignosulfonate material.

According to another embodiment, an ice-melt composition includes coating particles. Each of the coated particles includes a core and a coating at least partially surrounding the core. The core includes calcium chloride. The coating consists essentially of a lignosulfonate material and a colorant. The coated particles include about 0.1% to about 5%, by weight, of the lignosulfonate material.

According to another embodiment, a method of melting ice includes applying an ice-melt composition to ice. The ice melt composition includes coated particles. Each of the coated particles includes a core and a coating at least partially surrounding the core. The core includes calcium chloride. The coating includes a lignosulfonate material.

According to another embodiment, a method of making an ice-melt composition includes providing a plurality of particle cores and coating each of the plurality of particle cores with a liquid coating composition to form an ice-melt composition. Each of the particle cores includes calcium chloride. The liquid coating composition includes a lignosulfonate material.

DETAILED DESCRIPTION OF THE INVENTION

Figure 1:
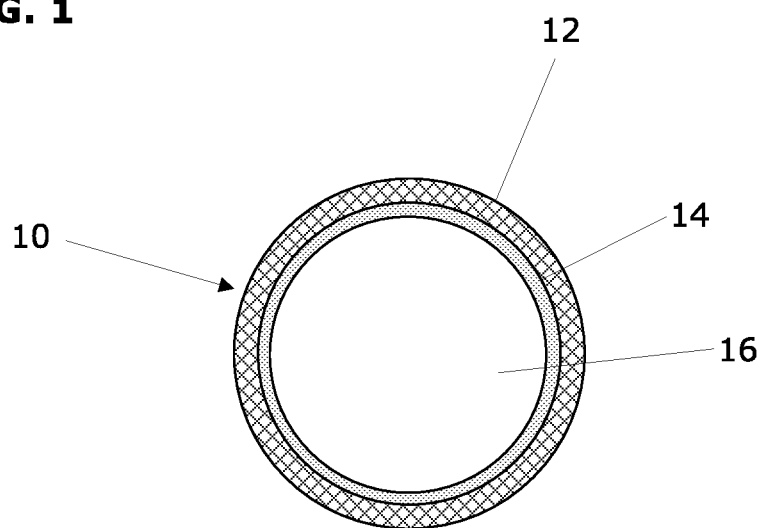
FIG. 1 depicts a cross-section view of a calcium chloride pellet according to one embodiment.

Ice-melt compositions are disclosed herein which can be useful for melting ice on various surfaces, including surfaces that people walk or drive on, such as sidewalks, driveways, and roads. The ice-melt compositions can include particles of an ice-melting material.

The particles of an ice-melting material can have any suitable size, shape, and dimensions for ice-melting applications. For example, the particles can be in the form of pellets, mini-pellets, granules, prills, nuggets, briquettes, or other various forms. The particles can also have any suitable particle size distribution. As can be appreciated, more uniform particle size distribution can be desirable, for example, to facilitate handling and use of the ice-melt compositions (e.g., to facilitate use with salt spreaders). In certain embodiments, about 50% or more of the particles can have a size, as measured along the longest axis, in the range of about 0.5 mm to about 5 mm. For example, suitable particles can have a size along the longest axis, of about 0.5 mm, about 0.6 mm, about 0.7 mm, about 0.8 mm, about 0.9 mm, about 1.0 mm, about 1.1 mm, about 1.2 mm, about 1.3 mm, about 1.4 mm, about 1.5 mm, about 1.6 mm, about 1.7 mm, about 1.8 mm, about 1.9 mm, about 2.0 mm, about 2.1 mm, about 2.2 mm, about 2.3 mm, about 2.4 mm, about 2.5 mm, about 2.6 mm, about 2.7 mm, about 2.8 mm, about 2.9 mm, about 3.0 mm, about 3.1 mm, about 3.2 mm, about 3.3 mm, about 3.4 mm, about 3.5 mm, about 3.6 mm, about 3.7 mm, about 3.8 mm, about 3.9 mm, about 4.0 mm, 4.1 mm, about 4.2 mm, 4.3 mm, 4.4 mm, about 4.5 mm, about 4.6 mm, about 4.7 mm, about 4.8 mm, about 4.9 mm, or about 5.0 mm. In certain embodiments, less than about 30% of the particles can have a size, as measured along the longest axis, larger than about 5 mm.

In certain embodiments, the particles, such as pellets or granules, can be sized using a sieve. For example, particles can be larger than about 35 mesh (US sieve size), including, about 35 mesh, about 30 mesh, about 25 mesh, about 20 mesh, about 15 mesh, about 10 mesh, about 5 mesh, or about 3.5 mesh. In certain embodiments, the particles can be sized between about 35 mesh and about 3.5 mesh, including, for example, at about 35 mesh, at about 30 mesh, at about 25 mesh, at about 20 mesh, at about 15 mesh, at about 10 mesh, at about 5 mesh, or at about 3.5 mesh. In certain embodiments, about 60%, or more, of the particles can be sized larger than about 35 mesh, including, for example, about 60% or more, about 65% or more, about 70% or more, about 75% or more, about 80% or more, about 85% or more, about 90% or more, or about 95% or more of the particles. In certain embodiments, about 40% or less of the particles can be sized larger than about 3.5 mesh, including, for example, about 40% or less, about 35% or less, about 30% or less, about 25% or less, about 20% or less, about 15% or less, about 10% or less, or about 5% or less of the particles.

In certain embodiments, the particles of an ice melting composition can include a core and a coating disposed at least partially around, or about, the core. In certain embodiments, the core can include calcium chloride and the coating can include a lignosulfonate material. The coating can fully surround or encapsulate the core, or the coating can only partially surround or coat the core.

In certain embodiments, the ice-melt composition can include any amount of calcium chloride suitable for melting ice. For example, in certain embodiments, the ice-melt compositions can include additional materials intermixed with the particles of an ice-melting material. Alternatively, or additionally, the ice-melt compositions can include particles with varying amounts of calcium chloride. With respect to the ice-melt composition in aggregate (i.e., as a bulk mass), the quantity of calcium chloride in the composition can range from about 60% to about 99.9% by weight. For example, the amount, by weight, of the calcium chloride in an ice-melt composition can be about 60%, about 62.5%, about 65%, about 67.5%, about 70%, about 72.5%, about 75%, about 77.5%, about 80%, about 82.5%, about 85%, about 87.5%, about 90%, about 91%, about 92%, about 93%, about 94%, about 95%, about 96%, about 97%, about 98%, about 99%, about 99.5%, or about 99.9%.

With respect to the individual particles of the ice-melt composition, each individual particle can also include varying amounts of calcium chloride. For example, each particle can include about 60% to about 99.9% calcium chloride by weight of the particle. In various embodiments, the particle can include about 60%, about 62.5%, about 65%, about 67.5%, about 70%, about 72.5%, about 75%, about 77.5%, about 80%, about 82.5%, about 85%, about 87.5%, about 90%, about 91%, about 92%, about 93%, about 94%, about 95%, about 96%, about 97%, about 98%, about 99%, about 99.5%, or about 99.9% calcium chloride by weight of the particle.

As can be appreciated, lignosulfonate is a widely-available byproduct of wood pulp processing. Specifically, wood from trees is composed mainly of three components: cellulose, hemicellulose, and lignin. In wood pulp processing, lignin can be sulfonated to form a water-soluble compound extractable from the pulp. As a result of the sulfonation, the solubilized lignosulfonates can be separated from the insoluble cellulose. These lignosulfonate byproducts can encompass a wide range of molecular weights and chemistries. Applicant has found that certain lignosulfonate materials can be used to coat calcium chloride to improve the safety profile of calcium chloride without impairing the use of calcium chloride for ice removal.

Generally, suitable lignosulfonate materials to coat the particles described herein can have a molecular weight in the range of about 1,000 to about 20,000. In certain embodiments, the lignosulfonate materials can be used in a salt form. For example, suitable lignosulfonate salts can include calcium lignosulfonate, sodium lignosulfonate, ammonium lignosulfonate, or a combination thereof.

In certain embodiments, each particle can include an amount of lignosulfonate material in the range of about 0.1% to about 10%, by weight, of the particle. For example, each particle can include about 0.1%, about 0.2%, about 0.3%, about 0.4%, about 0.5%, 0.6%, about 0.7%, about 0.8%, about 0.9%, about 1%, about 1.1%, about 1.2%, about 1.3%, about 1.4%, about 1.5%, about 1.6%, about 1.7%, about 1.8%, about 1.9%, about 2.0%, about 2.1%, about 2.2%, about 2.3%, about 2.4%, about 2.5%, about 2.6%, about 2.7%, about 2.8%, about 2.9%, about 3.0%, about 3.1%, about 3.2%, about 3.3%, about 3.4%, about 3.5%, about 3.6%, about 3.7%, about 3.8%, about 3.9%, about 4.0%, about 4.1%, about 4.2%, about 4.3%, about 4.4%, about 4.5%, about 4.6%, about 4.7%, about 4.8%, about 4.9%, about 5%, about 5.5%, about 6.5%, about 7.0%, about 7.5%, about 8.0%, about 8.5%, about 9.0%, about 9.5%, or about 10%, by weight, of a lignosulfonate material. In certain embodiments, each particle can include less than about 3%, by weight, of a lignosulfonate material; in certain embodiments, each particle can include about 1% to about 3%, by weight, of a lignosulfonate material; and in certain embodiments, each particle can include about 1.5% to about 2%, by weight, of a lignosulfonate material.

In certain embodiments, the ice-melt compositions described herein can include other ice-melting materials, such as rock salt (sodium chloride), potassium chloride, and/or urea. The ice-melt compositions can also, or alternatively, include non-slip aggregates, such as sand, cinders, and/or crushed limestone. As can be appreciated, other additives and compounds can also be added including colorants and drying additives.

In certain embodiments, an ice-melt composition can include a coated particle core consisting essentially of calcium chloride.

In certain embodiments, an ice-melt composition can include a coated particle core that includes calcium chloride and a coating over the core, where the coating consists essentially of a lignosulfonate material. In certain embodiments, the coating over the core can consist essentially of a lignosulfonate material, and additionally a colorant and/or a drying additive. In certain embodiments, the colorant can be water-soluble.

In certain embodiments, the drying additive can be a finely powdered water-absorbent compound including, for example, precipitated silica, anhydrous magnesium sulfate, and/or diatomaceous earth.

In certain embodiments, the ice-melt compositions described herein do not include brewers condensed solubles (BCS), distillers condensed solubles (DCS), and/or condensed corn steep liquid (CCSL).

The ice-melt compositions described herein can be more advantageous to use than calcium chloride ice-melt compositions known in the art. In certain embodiments, the lignosulfonate material coating can reduce the hydroscopic properties of the composition as compared to the ice-melt compositions known in the art. In such embodiments, the composition can advantageously be used in environments where humans or animals may come into contact with the ice-melt composition, such as sidewalks, driveways, and roads.

Without being bound by theory, it is theorized that lignosulfonate materials can hydrate a thin outer surface of the calcium chloride core. In combination with the coating provided by the lignosulfonate material itself, such hydration can reduce the harmful effects caused by calcium chloride dissolving.

FIG. 1 depicts an exemplary coated calcium chloride pellet 10 of an ice-melt composition. The coated calcium chloride pellet 10 includes a core 16 of calcium chloride and a coating 12 of calcium lignosulfonate about the core 16. The coating 12 has a higher water content than the calcium chloride core 16, which serves to hydrate a thin outer surface 14 of the core 16. The hydration of the outer surface 14, along with the physical barrier protection provided by the coating 12, can reduce the harmful or irritating effect of the calcium chloride pellet 10 when it comes into contact with a person or animal. When applied to ice, the coating 12 can dissolve and expose the calcium chloride core 16 to the ice.

Methods of making an ice-melt composition as described herein are also provided. In certain embodiments, the method includes: providing a core including calcium chloride; and coating the core with a liquid composition including a lignosulfonate material. The lignosulfonate coating can be applied onto the cores using any suitable technique, such as conventional spraying coating techniques. As can be appreciated, the coating process can be a batch process, a semi-batch process, or a continuous process in certain embodiments.

The amount of lignosulfonate material in the coating liquid can be selected such that the liquid has a viscosity sufficiently low to facilitate spraying or coating onto the core. In certain embodiments, the amount of the lignosulfonate material in the coating liquid can vary from about 1% to about 95% by weight of the coating liquid. For example, the coating liquid can include about 1%, about 2%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95% of a lignosulfonate material by weight of the coating liquid. In certain embodiments, the coating liquid can include from about 20% to about 80% of the lignosulfonate material, for example, from about 25% to about 60% of the total weight of the coating liquid.

Figure 2:
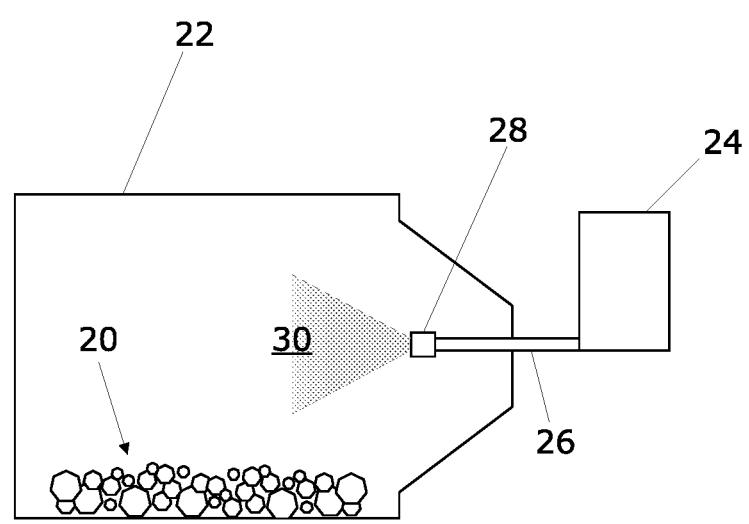
FIG. 2 depicts a cross-section view of a spray coating apparatus to coating calcium chloride according to one embodiment.

FIG. 2 depicts an example coating process. In FIG. 2, calcium chloride pellets 20 are placed into the chamber of a rotary mixer 22. The rotary mixer 22 is equipped with a spray nozzle 28 that is connected to a spray solution tank 24 via a supply line 26. The spray solution tank 24 is filled with a lignosulfonate coating solution, which is applied onto the calcium chloride pellets 20 by a spray 30 generated by the spray nozzle 28 while the rotary mixer 22 is turning.

Example 1

930 grams of calcium chloride pellets (SAFE STEP® Extreme 7300) were placed into a table top rock polisher tumbler. A spray solution was made by mixing Norlig A (a 58% calcium lignosulfonate solution in water from LIGNOTECH USA®) with water at a 1:1 weight to weight ratio. The resulting spray solution contained about 29% calcium lignosulfonate by weight. The spray solution was filled into a pressure bottle. With the tumbler activated, 70 grams of the spray solution was sprayed onto the calcium chloride pellets using an 8002 nozzle at 40 pounds per square inch ("psi"). The total amount of spray solution loaded onto the calcium chloride pellets was 7% by weight (5% water, plus 2% calcium lignosulfonate).

The coated material initially had a wet appearance, but dried after about 5 minutes. The material was warm from the heat of hydration of the calcium chloride. The product was spread out onto a tray and placed in an oven at 104° C. for 30 minutes to remove surface tackiness. The coated material had a uniform tan color and the he calcium lignosulfonate coating weight was determined to be 2% by weight of the pellet. When applied onto a patch of outdoor ice, the coated calcium chloride pellets melted the ice at about the same speed and rate as the uncoated calcium chloride pellets (SAFE STEP® Extreme 7300). These results demonstrated that the coated calcium chloride pellets can provide improved safety without significantly compromising ice melting performance.

Example 2

144.53 pounds of calcium chloride pellets (Occidental Chemical Corp.) were placed into a Munson mixer equipped with a 650067 spray nozzle. A spray solution was made by mixing 680.39 grams of water and 1769.01 grams of Norlig A. The resulting spray solution contained 41% calcium lignosulfonate by weight. This spray solution was divided into equal portions into three pressure bottles. The bottles were then heated to about 120° F.

After starting the mixer, the first bottle was connected to the spray nozzle and its contents were sprayed out at 40 psi for a spray time of 2 minutes 45 seconds. The temperature of the calcium chloride material taken after 2 minutes and 8 minutes from the start of spraying was 77.7° F. After 10 minutes, the second bottle was connected to the spray nozzle and its contents were sprayed out at 40 psi for a spray time of 2 minutes 35 seconds. The temperature of the calcium chloride material taken at 2 minutes and 8 minutes from the start of the second bottle spraying was 87.2° F. After 10 minutes, the third bottle was connected to the spray nozzle and its contents were sprayed out at 40 psi for a spray time of 2 minutes 35 seconds. The temperature of the calcium chloride material was 94.0° F. and 93.8° F. at 2 minutes and 8 minutes respectively from the start of the third bottle spraying. After 5 minutes, 34.02 grams of precipitated silica (HI-SIL® 233) was added to the batch and the material was allowed to cure for an additional 15 minutes before removing from the mixer. The still warm material was free flowing and tan in color. The material contained 1.5% by weight calcium lignosulfonate coating by weight of the particle.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of ordinary skill in the art. Rather it is hereby intended the scope be defined by the claims appended various embodiments. The scope is, of course, not limited to the examples or embodiments set forth herein, but can be employed in any number of applications and equivalent articles by those of hereto.

What is claimed is:

1. An ice-melt composition comprising:
    coated particles, wherein each coated particle comprises:
        a core comprising calcium chloride; and
        a coating at least partially surrounding the core, the coating consisting essentially of a lignosulfonate and an optional colorant; and
    wherein the coated particles comprise about 60% to about 99.9%, by weight, of the calcium chloride and about 0.1% to about 5%, by weight, of the lignosulfonate material.

2. The ice-melt composition of claim 1, wherein the lignosulfonate material comprises calcium lignosulfonate, sodium lignosulfonate, ammonium lignosulfonate, or mixtures thereof.

3. The ice-melt composition of claim 1, wherein the coated particles are pellets, granules, or mixtures thereof.

4. The ice-melt composition of claim 1, wherein about 60% or more of the coated particles are sized at about 35 mesh or greater.

5. The ice-melt composition of claim 1, wherein about 40% or less of the coated particles are sized at about 3.5 mesh or greater.

6. The ice-melt composition of claim 1, wherein the lignosulfonate material is soluble in water.

7. The ice-melt composition of claim 1, wherein the coating further consists essentially of the colorant.

8. The ice-melt composition of claim 7, wherein the colorant is water-soluble.

9. The ice-melt composition of claim 1, wherein the lignosulfonate material at least partially hydrates the calcium chloride.

10. An ice-melt composition comprising:
    coated particles, wherein each coated particle comprises:
        a core consisting essentially of calcium chloride; and
        a coating at least partially surrounding the core, the coating consisting essentially of a lignosulfonate material, an optional colorant, an optional drying additive, an optional non-slip aggregate, and an optional ice-melting material selected from the group consisting of a chloride salt and urea; and
    wherein the coated particles comprise about 0.1% to about 5%, by weight, of the lignosulfonate material.

11. The ice-melt composition of claim 10, wherein the lignosulfonate material comprises calcium lignosulfonate, sodium lignosulfonate, ammonium lignosulfonate, or mixtures thereof.

12. The ice-melt composition of claim 10, wherein the particles are pellets, granules, or mixtures thereof.

13. The ice-melt composition of claim 10, wherein about 60% or more of the coated particles are sized at about 35 mesh or greater.

14. The ice-melt composition of claim 10, wherein about 40% or less of the coated particles are sized at about 3.5 mesh or greater.

15. The ice-melt composition of claim 10, wherein the lignosulfonate material is soluble in water.

16. An ice-melt composition comprising:
    coated particles, wherein each coated particle comprises:
        a core consisting essentially of calcium chloride; and
        a coating at least partially surrounding the core, the coating consisting of a lignosulfonate material, a colorant, an optional drying additive, an optional non-slip aggregate, and an optional ice-melting material selected from the group consisting of a chloride salt and urea; and
    wherein the coated particles comprise about 0.1% to about 5%, by weight, of the lignosulfonate material.

17. The ice-melt composition of claim 16, wherein the lignosulfonate material comprises calcium lignosulfonate, sodium lignosulfonate, ammonium lignosulfonate, or mixtures thereof.

18. The ice-melt composition of claim 16, wherein the particles are pellets, granules, or mixtures thereof.

19. The ice-melt composition of claim 16, wherein about 60% or more of the coated particles are sized at about 35 mesh or greater.

20. The ice-melt composition of claim 16, wherein about 40% or more of the coated particles are sized at about 3.5 mesh or greater.

21. The ice-melt composition of claim 16, wherein the lignosulfonate material is soluble in water.

22. The ice-melt composition of claim 16, wherein the colorant is water soluble.

* * * * *